UNITED STATES PATENT OFFICE.

GEORGE HERBERT PRICE, OF QUEENSTOWN, CAPE COLONY.

PREPARATION FOR AUTOMATICALLY SEALING PUNCTURES IN PNEUMATIC TIRES.

1,064,769.      Specification of Letters Patent.      Patented June 17, 1913.

No Drawing.      Application filed August 14, 1911. Serial No. 643,947.

*To all whom it may concern:*

Be it known that I, GEORGE HERBERT PRICE, a subject of the King of Great Britain, residing at Queenstown, in the Province of the Cape of Good Hope, South Africa, have invented a new or Improved and Useful Preparation for Automatically Sealing Punctures in Pneumatic Tires, of which the following is a specification.

This invention relates to means for automatically sealing accidentally produced punctures in the inner india rubber tubes of pneumatic tires of cycles and other wheeled road vehicles and the said invention consists in a liquid preparation for insertion in said inner tubes.

The preparation consists of the milk or sap of plants of the genus *Euphorbia*, such for instance as *Euphorbia pulvinata* (Marloth) or of other plants the milk or sap of which possesses rubber qualities, together with a substance, such as glycerin or ammonium hydrate, which prevents coagulation of the milk or sap, and usually also a preservative such as formalin.

It has been found in practice that a preparation well suited for the aforesaid purpose may be produced by use of the aforesaid matters in the following proportions, viz: one quart of the aforesaid milk or sap and one tablespoonful of glycerin and two drops of formalin or instead of the said glycerin three parts of ammonia to every hundred parts of the said milk or sap. In making the said preparation the glycerin or ammonia is thoroughly mixed with the said milk or sap at the time it is tapped and the formalin is added within a week after. The formalin may be added to the milk or sap at the same time as the glycerin or ammonia but a better result is obtained by adding the glycerin or ammonia to and thoroughly mixing it with the milk or sap before adding the formalin. The minimum quantity of the said preparation required for an inner tube eighty inches in length and two inches in diameter is three tablespoonfuls and for inner tubes of other size the minimum quantity of the preparation required is in a like ratio.

In using the preparation it is inserted in the inner tube which is afterward inflated.

I claim:—

1. A preparation comprising the milk or sap of plants of the genus *Euphorbia* and glycerin.

2. A preparation comprising the milk or sap of *Euphorbia pulvinata* and glycerin.

3. A preparation comprising the milk or sap of plants of the genus *Euphorbia*, glycerin and a preservative.

4. A preparation comprising the milk or sap of *Euphorbia pulvinata*, glycerin and a preservative.

5. A preparation comprising the milk or sap of plants of the genus *Euphorbia*, glycerin and formalin.

6. A preparation comprising the milk or sap of *Euphorbia pulvinata*, glycerin and formalin.

GEORGE HERBERT PRICE.

Witnesses:
PATRICK MCMAHON,
GEO. SMITH LYMING.